Sept. 27, 1927.  
D. S. BEEBE  
1,643,601  
POURING APPARATUS FOR GLASS FURNACES  
Filed March 5, 1926    2 Sheets-Sheet 2
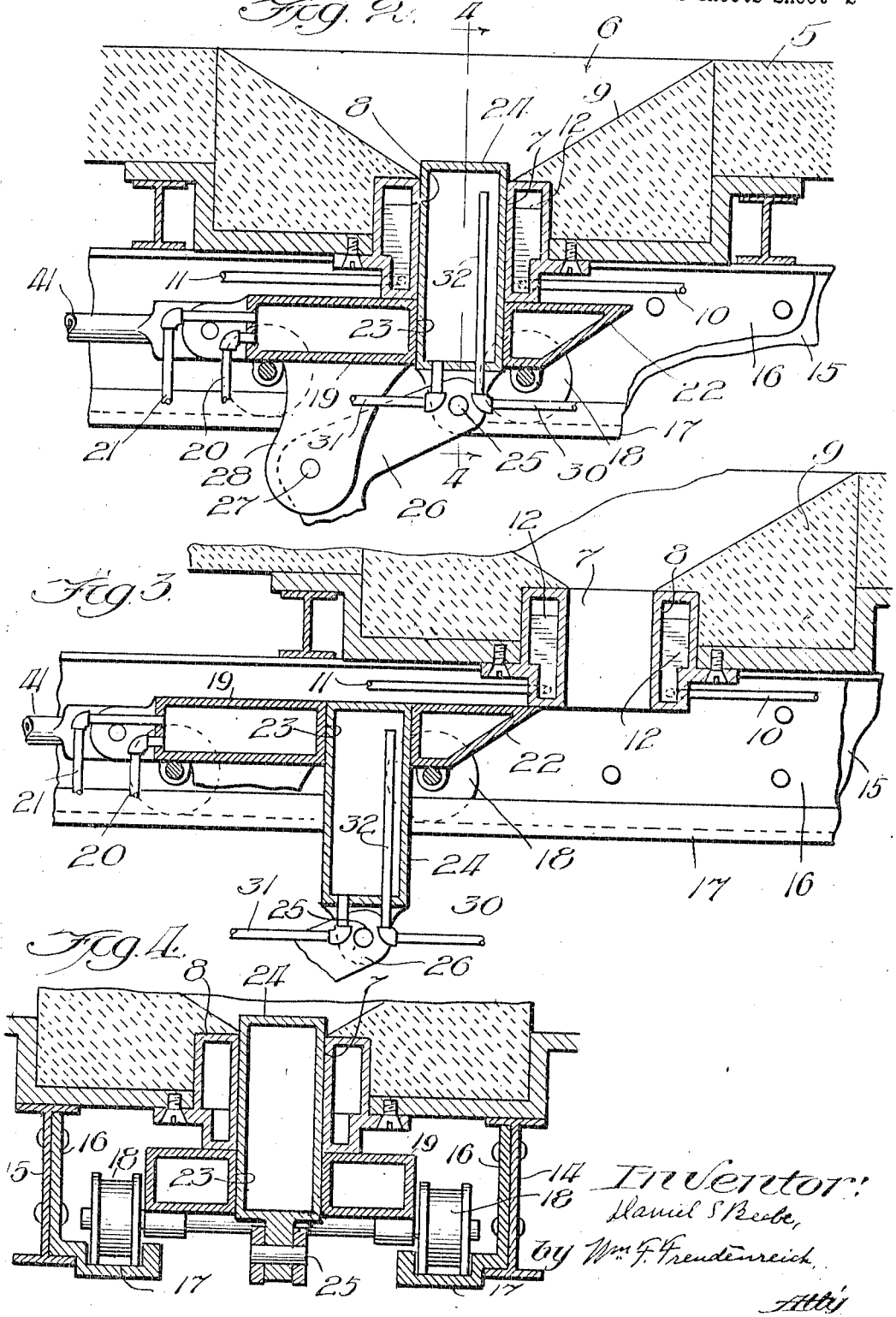

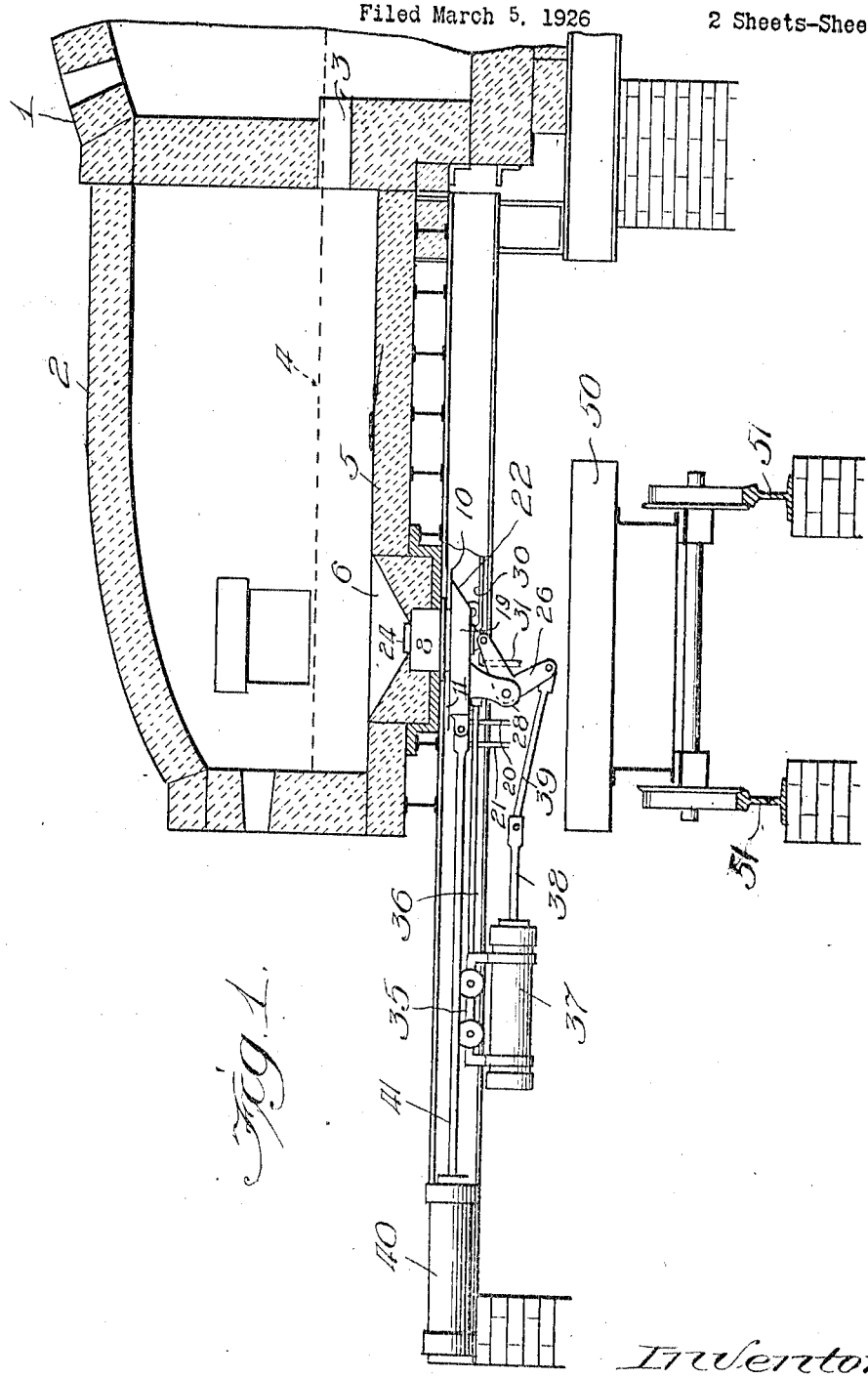

Patented Sept. 27, 1927.

1,643,601

UNITED STATES PATENT OFFICE.

DANIEL S. BEEBE, OF CHICAGO, ILLINOIS, ASSIGNOR TO THE VITROLITE COMPANY, OF PARKERSBURG, WEST VIRGINIA, A CORPORATION OF WEST VIRGINIA.

POURING APPARATUS FOR GLASS FURNACE.

Application filed March 6, 1926. Serial No. 92,495.

In casting large sheets or slabs of glass, the practice heretofore has been to dip the molten glass from the furnace by means of ladles. This operation requires many workmen, in order that the metal be rapidly delivered to the casting table. Furthermore, in dipping a ladle into the molten glass, air bubbles are created in the latter, and some of these air bubbles may remain in the finished product and render it defective.

The object of the present invention is to make it possible to pour molten glass directly upon a casting table or the like from the furnace, without the intervention of ladles or other similar means.

I have found that if a large receptacle for molten glass is provided with a discharge outlet of considerable area in the bottom thereof, the molten glass may be successively deposited upon a casting table brought underneath the discharge outlet, without the creation of air bubbles; thus insuring a perfect product and avoiding the necessity of employing a large number of men to dip the molten glass and carry it to the table. The discharge outlet may be controlled by a slide valve located underneath the same and may be wedge-shaped at the end which is the advancing end when the valve is moved to close the outlet; this wedging end cutting through the column of molten glass as the outlet is closed. In order to secure successful results I have found it desirable to employ a comparatively long outlet passage leading out of the bottom of the furnace chamber; this outlet passage being formed in a hollow casting made of a metal having high heat resisting qualities. This casting, as well as the valve must be cooled, conveniently by flowing water through the same. Since the walls bounding the outlet or discharge passage are comparatively cool, it is necessary to prevent the formation of a stationary column of molten glass, in the same, while the valve is closed, which column would become chilled and interfere with the discharge of the molten glass when the valve is opened and injure the quality of the cast and rolled product if it should succeed in being delivered upon the casting table. I have therefore provided the valve with a plunger extending through the same and through the discharge passage when the valve is closed; the plunger in its raised position projecting upwardly beyond the inlet end of the passage, so that after the valve is closed and the plunger raised, all of the molten glass contained within the passage will be pushed up into the body of heated metal in the main chamber. This plunger, which must also be made of a metal highly resistant to heat, must be cooled, conveniently by passing water through the same. Since the plunger is cool as compared with the molten metal, a small part of the latter that is in contact with the extreme upper end of the plunger when the latter is raised, will chill and will serve as a bait to draw the molten glass down into the discharge passage as the plunger recedes during the operation of withdrawing it from such passage, preparatory to opening the valve. I have found that by sloping the bottom of the furnace chamber from the sides toward the upper end of the discharge passage, so that a comparatively deep body of molten glass will overlie the discharge passage, the metal will flow out in a solid stream, without creating a vortex resulting in an axial opening in which air may be confined and subsequently form bubbles in the finished product.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a vertical section through a furnace provided with a valved discharge outlet arranged in accordance with the present invention, a casting table being shown in position beneath the outlet; Fig. 2 is a vertical section, on an enlarged scale, through the bottom of the furnace at the outlet, showing the valve closed and the plunger up; Fig. 3 is a view similar to Fig. 2, showing the plunger down and the valve open and Fig. 4 is a section taken on line 4—4 of Fig. 2.

Referring to the drawings, 1 represents a glass furnace having connected thereto a projecting auxiliary furnace chamber 2. The molten glass flows from the main furnace into the auxiliary chamber through a passage 3, so as to maintain a level of molten glass in the auxiliary chamber indicated by the dotted line 4.

In the bottom wall 5 of the auxiliary chamber, at a point remote from the main furnace, is an inverted conical recess 6 from out of the bottom of which opens the discharge outlet for the molten metal. As best shown in Figs. 2, 3 and 4, the discharge outlet is in the form of a cylindrical passage 7 of considerable diameter, formed in a hollow walled casting 8. The firebrick 9 of which the bottom wall of the auxiliary chamber is formed, preferably covers the top of the casting so as to protect it more or less from the action of the molten glass. The casting is kept cool by means of water flowing into the same through a pipe 10, and out again through a pipe 11. These pipes may both be connected to the lower end of the casting, the water being compelled to flow to the top by means of partitions 12 rising upwardly from the bottom of the chamber within the hollow walls to a point near the top of the chamber; the disposition of the pipes 10 and 11 being such that the water must rise to the top of the casting on one side of the partitions, before it can reach the outlet pipe on the other side.

Below the auxiliary chamber 2 are parallel beams 14 and 15, conveniently structural I beams. Secured to these beams are members 16 having horizontal channel shaped tracks 17 lying on the inner sides of the beams. Rolling along these tracks are wheels 18 that support a horizontal movable valve 19 that has a flat upper surface in contact with a flat bottom face of the outlet casting. The valve is made hollow and it is cooled by water flowing into the same through a pipe 20 and out through a discharge pipe 21. One end of the valve has a chisel edge 22 which, as the valve is moved from its open position, as shown in Fig. 3, to the closed position shown in Fig. 2, cuts through the column of molten glass leaving the discharge outlet. The valve is provided with an opening 23 extending vertically through the same and having a diameter equal to that of the discharge passage 7. Movable vertically in this opening is a hollow plunger 24. In the arrangement shown, the plunger is pivotally connected at its lower end, as indicated at 25, to one arm of a bell crank lever 26 that is pivoted at its elbow, as at 27, between depending ears 28 integral with the valve. Normally, when the valve is closed, no metal being withdrawn from the furnace, the plunger extends up through the discharge passage 7 and projects a short distance into the conical recess 6 as shown in Fig. 2. When the outlet passage is to be opened, the plunger is first drawn down until its top is flush with the top of the valve, as shown in Fig. 3, and then the valve is moved laterally along its tracks until it is clear of the lower end of the outlet passage.

When the valve is open, as shown in Fig. 2, the molten glass flows down in a solid column through the discharge passage until the valve is again closed. To close the valve it is moved toward the right in Fig. 3, first severing the column of molten glass and stopping the flow. The plunger is then moved up, forcing the molten material in the outlet passage ahead of it into the hot mass constituting the supply of molten glass in the auxiliary chamber. Since the plunger accurately fits the outlet passage, the bounding walls of the latter will be scraped clean as the plunger rises. Therefore, since the more or less chilled glass that is pushed up out of the outlet passage becomes effectively re-heated when it enters the large body of molten glass, the flow of glass will be free and unobstructed when the valve is opened, and there will be no chilled residue that will be deposited on the casting table.

The plunger is cooled in any desired way, conveniently by introducing into the interior thereof cooling water through a pipe or conduit 30, and allowing the water to discharge through a pipe or conduit 31. In order to insure that the cool water will always reach the top of the plunger, the inlet pipe 30 is connected to a stand pipe 32 that extends upwardly in the plunger and has its open end terminating a short distance below the top of the plunger. The cooling water therefore enters the plunger at the top.

The valve and the plunger may be operated in any suitable way. In the arrangement shown, the beams 14 and 15 and the tracks 17 are extended outwardly beyond the end of the auxiliary furnace chamber. Mounted on the extended portions of the tracks is a wheeled truck 35 connected to the valve by a rod 36 so that the truck and the valve move in unison with each other. Depending from the truck is an air cylinder 37 having a piston rod 38 between which and the bell crank lever 26 is arranged a connecting rod 39. When air is turned into the air cylinder to move the piston rod in one direction, the bell crank lever is swung so as to raise the plunger. When air is admitted to the cylinder to move the piston rod in the opposite direction, the plunger is retracted. The valve may be operated by a second air cylinder 40 mounted above the outer ends of the tracks and having a piston rod 41 connected to the valve.

The auxiliary furnace chamber is located at a considerable distance above the floor on which the casting table rests, so that the table, indicated at 50, may be moved underneath the outlet from the auxiliary chamber along tracks or rails 51, or otherwise, to permit the molten glass to be deposited directly on the table from the furnace when the valve is opened.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A glass furnace chamber having a discharge passage through which molten glass is adapted to flow by gravity, a valve slidable across the outlet end of said passage, and means carried by the valve for pushing the glass remaining in said passage when the valve is closed back into the furnace chamber.

2. A glass furnace chamber having a discharge outlet through the bottom, a valve slidably mounted underneath the chamber so as to be movable transversely to open and close the outlet, and means carried by said valve and operable when the valve is closed to push the material in said outlet back into the furnace chamber.

3. A glass furnace having a discharge outlet through the bottom, a sliding valve on the underside of said bottom for controlling said outlet, a plunger extending through said valve and into said outlet, and means for moving the plunger relatively to the valve from a position in which it extends to the top of the outlet to a position in which the upper end thereof lies below the bottom of said wall.

4. A glass furnace having a discharge outlet through the bottom wall, a sliding gate on the underside of said wall for controlling said outlet, and a plunger of approximately the same cross-sectional shape and area as said outlet mounted in the gate and movable relatively thereto into and out of said outlet.

5. A glass furnace having a discharge outlet through the bottom wall, a sliding valve on the underside of said wall for controlling said outlet, a plunger of approximately the same cross-sectional shape and area as said outlet mounted in the valve and movable relatively thereto into and out of said outlet, and means for cooling said valve and said plunger.

6. A glass furnace chamber having a discharge passage through which molten glass is adapted to flow by gravity, a slidable valve movable across the outlet end of said passage, a plunger carried by said valve and movable with respect to the same from a position below the outlet end of the passage to a position in which its upper end projects above the passage and into said chamber, and means for cooling the upper end of said plunger to cause the glass to congeal on the same and serve as a bait to draw the molten glass in the chamber into said passage when the plunger is lowered.

In testimony whereof, I sign this specification.

DANIEL S. BEEBE.